(12) United States Patent
Navab et al.

(10) Patent No.: US 9,578,313 B2
(45) Date of Patent: Feb. 21, 2017

(54) METHOD OF ENHANCED DEPTH IMAGE ACQUISITION

(75) Inventors: Nassir Navab, Munich (DE); Victor Antonio Castaneda Zeman, Santiago (CL); Diana Mateus, Munich (DE)

(73) Assignee: Technische Universitat Munchen Forschungsforderung und Technologietransfar, Munich (DE)

(*) Notice: Subject to any disclaimer, the term of this patent is extended or adjusted under 35 U.S.C. 154(b) by 602 days.

(21) Appl. No.: 13/984,551

(22) PCT Filed: Feb. 10, 2012

(86) PCT No.: PCT/EP2012/052339
§ 371 (c)(1),
(2), (4) Date: Mar. 6, 2014

(87) PCT Pub. No.: WO2012/107574
PCT Pub. Date: Aug. 16, 2012

(65) Prior Publication Data
US 2014/0333728 A1    Nov. 13, 2014

(30) Foreign Application Priority Data

Feb. 10, 2011 (EP) .................................... 11154039

(51) Int. Cl.
*H04N 13/02* (2006.01)
*G01S 7/497* (2006.01)
*G01S 17/87* (2006.01)
*G01S 17/89* (2006.01)
*G01S 17/00* (2006.01)

(52) U.S. Cl.
CPC ........... *H04N 13/0271* (2013.01); *G01S 7/497* (2013.01); *G01S 17/003* (2013.01); *G01S 17/87* (2013.01); *G01S 17/89* (2013.01)

(58) Field of Classification Search
CPC . G01S 7/497; H04N 13/0271; H04N 13/0203; H04N 13/0239; H04N 13/0242; H04N 13/0246; H04N 13/0007; G06T 7/0051; G06T 7/0065
See application file for complete search history.

(56) References Cited

U.S. PATENT DOCUMENTS

| | | | |
|---|---|---|---|
| 7,791,715 B1 * | 9/2010 | Bamji | G01C 3/08 356/4.01 |
| 2006/0132432 A1 * | 6/2006 | Bell | G06F 3/011 345/156 |

(Continued)

OTHER PUBLICATIONS

Fuchs et al. "Extrinsic and Depth Calibration of TOF-Camera", 2008 IEEE.*

(Continued)

*Primary Examiner* — Nathnael Aynalem
(74) *Attorney, Agent, or Firm* — Gordon & Jacobson, P.C.

(57) ABSTRACT

The present invention provides a method and apparatus for depth image acquisition of an object wherein at least two time-of-flight cameras are provided and the object is illuminated with a plurality of different light emission states by emitting light signals from each camera. Measurements of the light reflected by the object during each light emission state are obtained at all the cameras wherein the measurements may then be used to optimize the depth images at each of the cameras.

13 Claims, 3 Drawing Sheets

(56) References Cited

U.S. PATENT DOCUMENTS

2008/0007709 A1* 1/2008 Bamji .................... G01C 3/08
356/5.01
2012/0044093 A1* 2/2012 Pala ..................... G01S 7/4863
340/963

OTHER PUBLICATIONS

Zhu et al. "Fusion of Time-of-Flight Depth and Stereo for High Accuracy Depth Maps", 2008 IEEE.*
"Time-of-Flight Cameras with Multiple Distributed Illumination Units", Lottner et al., ISCGAV'08 Proceedings of the 8th Conference on Signal Processing, Computational Geometyry and Artificial Vision, Aug. 22, 2008, pp. 40-56, XP55004507, ISBN; 978-9-60-676694-4.
"Multi-view Image and ToF Sensor Fusion for Dense 3D Reconstruction", Young Min Kim et al, 2009 IEEE 12th International Conference on Computer Vision Workshops, ICCV Workshops: Kyoto, Japan, Sep. 27-Oct. 4, 2009, Institute of Electrical and Electronics Engineers, (Sep. 27, 2009), pp. 1542-1549, XP031664460, ISBN: 978-1-4244-4442-7.

* cited by examiner

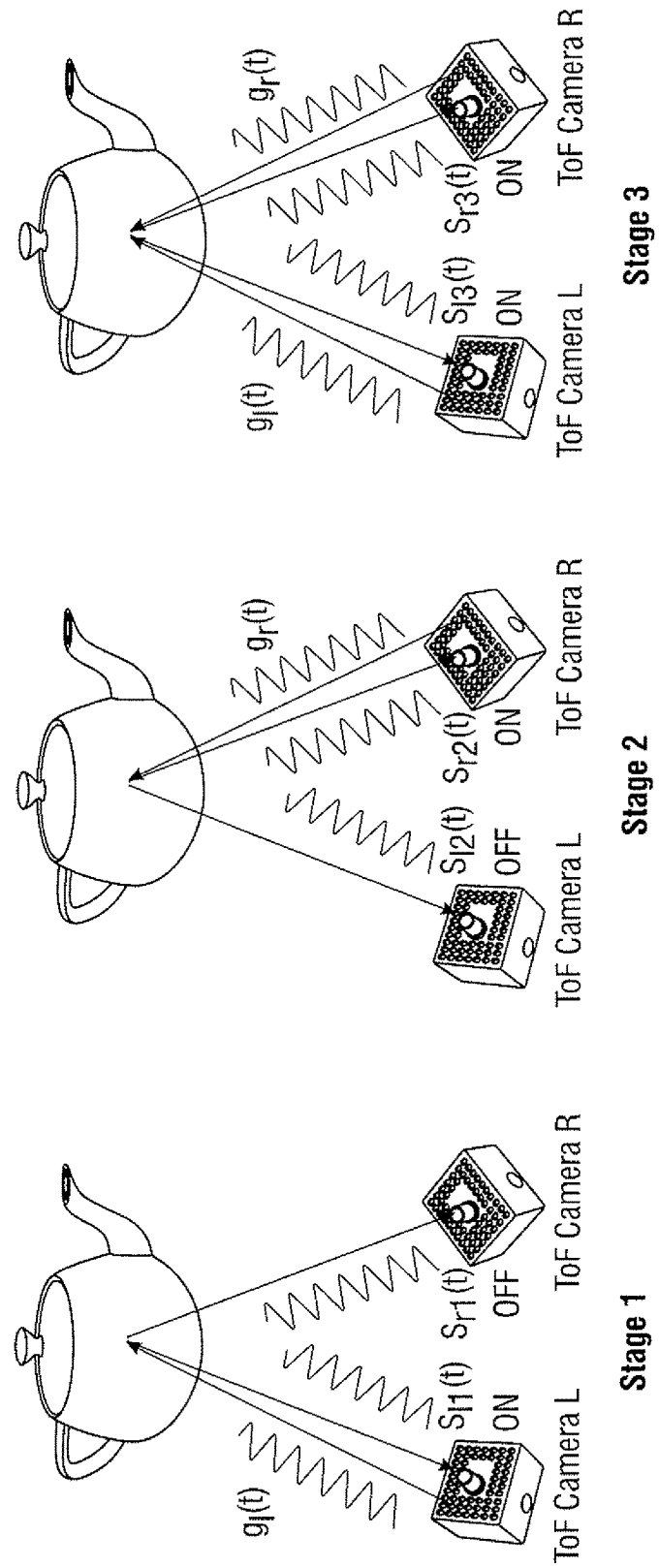

METHOD OF ENHANCED DEPTH IMAGE ACQUISITION

CROSS-REFERENCE TO RELATED APPLICATIONS

This application claims priority from PCT/EP2012/052339 filed on Feb. 10, 2012 and from EP 11154039.9 filed on Feb. 10, 2011 both of which are hereby incorporated by reference in their entireties.

BACKGROUND

Time of Flight (ToF) cameras are active range sensors that provide depth images at high frame-rates. They are equipped with a light source, normally infrared, that illuminates an object, for example a human body, or surface which may comprise different materials, wherein the object or surface may be part of a scene, and a CMOS/CCD (Charge-Coupled Device) sensor, as in a standard camera, that captures the reflected infrared light. The distance to the objects in the observed scene is measured based on the time of flight principle, that is, the distance is proportional to the time spent by the signal to reach the surface of an object and come back.

Depth measurements may in this way obtained for each pixel of the CMOS/CCD sensor and be used to produce a depth image. Fast acquisition of depth images is of great use in a wide range of applications, for instance, in robotics, human machine interaction and scene modelling. However, current commercially available devices have a low resolution and are affected by several sources of errors such as noise, systematic wiggling error, reflectivity/integration time error and flying pixels.

Several approaches exist that aim to solve the problem of the improvement of the depth measurements, including different ways to calibrate the ToF camera, fusing ToF camera with single or stereo RGB cameras, or fusing a sequence of depth image for a higher resolutions. There are also a number of methods that combine several ToF in order to create 3D reconstructions. The drawback of such approaches is that they mostly rely at some level on putting in correspondence point clouds derived from the depth images.

A known technique to enhance depth ToF images include calibrating the depth by fitting a non-linear correction function that relates the uncorrected depth, intensity and amplitude. A further approach involves intensity and wiggling adjustment before correcting the depth information. It is also possible to compensate the internal and environmental factor, like the inner temperature, integration time, ambient temperature, light or object properties. Another type of calibration can be made using special reflective checkerboards. All of these approaches involve a large amount of laborious calibration.

A second trend to improve the ToF depth images is to use ToF simultaneously with other cameras. A high-resolution colour camera together with a ToF camera in a calibrated setup allows removing outliers, smoothing the depth images and increasing the depth resolution. Multiple view systems combining several ToF and high-resolution colour cameras have also been used to create 3D textured reconstructions. This clearly increases the costs and complexity of the image acquisition system overall.

Most methods that combine purely ToF depth images rely on finding correspondences between the point clouds generated from different views, e.g. using Iterative Closest Point method. A second option is to combine the depth images in time assuming static scene in order to obtain depth super-resolution. These methods are conducted posterior to the image acquisition and are also complex, involving a large amount of processing.

Finally, a related optimisation method optimises the surface observed by a single ToF camera using shading constraints and photometric properties of the surface with accuracy improvements. However, the accuracy is improved at the significant cost of generally slow optimisations.

SUMMARY OF THE INVENTION

The present invention is recited in the independent claims. Preferred, non-limiting embodiments are recited in the sub-claims.

In general, the present invention resides in a novel method to acquire depth images, based on combining at least two ToF cameras. The present invention modifies the depth image acquisition procedure by actively controlling the lighting of an object such that the at least two cameras emit and measure the reflected light in different lighting states. Assuming the scene is static during these three stages and gathering the obtained depth measurements in each lighting state, a set of constraints is established that should hold in every step and may be used to optimise the depth images formed by each camera. The ToF configuration of the present invention advantageously reduces the noise of ToF cameras and enables the production of smooth and accurate depth value estimates of the observed scene. The only hardware requirements of the present invention are access to the control of the lights of the two cameras and that the ToF cameras use the same light wavelength and no synchronisation of the two cameras is required.

The method of the invention relies on a calibrated ToF configuration, as illustrated in FIG. 1 and on an active control of the lighting of the object. According to the invention, the lighting is controlled by turning the lighting of the each of the cameras on and off alternately. Depth measurements are determined in each state. The depth images in each camera may then be optimised both overall and per pixel based on the measurements determined during the different lighting stages and using the geometrical constraints of the set-up according to the invention. In contrast to the prior art, the present invention improves ToF depth images using changing lighting conditions and multiple views. In addition, the present invention is able to use the interference generated from light signals emitted simultaneously from different cameras using the same modulation frequency.

The calibration of the geometry of the stereo ToF set-up is required and conducted according to standard techniques. Further pre-processing steps such as filtering and depth calibration can be used complementary in conjunction with the present invention.

The use of high-resolution colour cameras is not required but can also be used as a complement of the present invention.

According to an embodiment of the invention, the at least two ToF cameras may operate at the same modulation frequency since the signals of the at least two ToF cameras are relied upon to interfere in order to create high confidence measurements. This simplifies the acquisition of such an image by obviating the need to provide cameras which operate at different modulation frequencies or having to synchronise the output of the cameras with one another.

The present invention does not combine point clouds of two depth images in order to attempt to achieve a higher resolution, but rather optimises the depth images at the acquisition stage. At least two depth measurements under different lighting conditions are acquired per camera in order to conduct the optimisation.

BRIEF DESCRIPTION OF THE DRAWINGS

FIG. 3 shows two ToF cameras acquiring the light signals reflected from the object for the three stages in Table 1 in accordance with a preferred embodiment of the present invention.

DETAILED DESCRIPTION OF EMBODIMENTS OF THE INVENTION

Monocular ToF Camera

Figure 1:
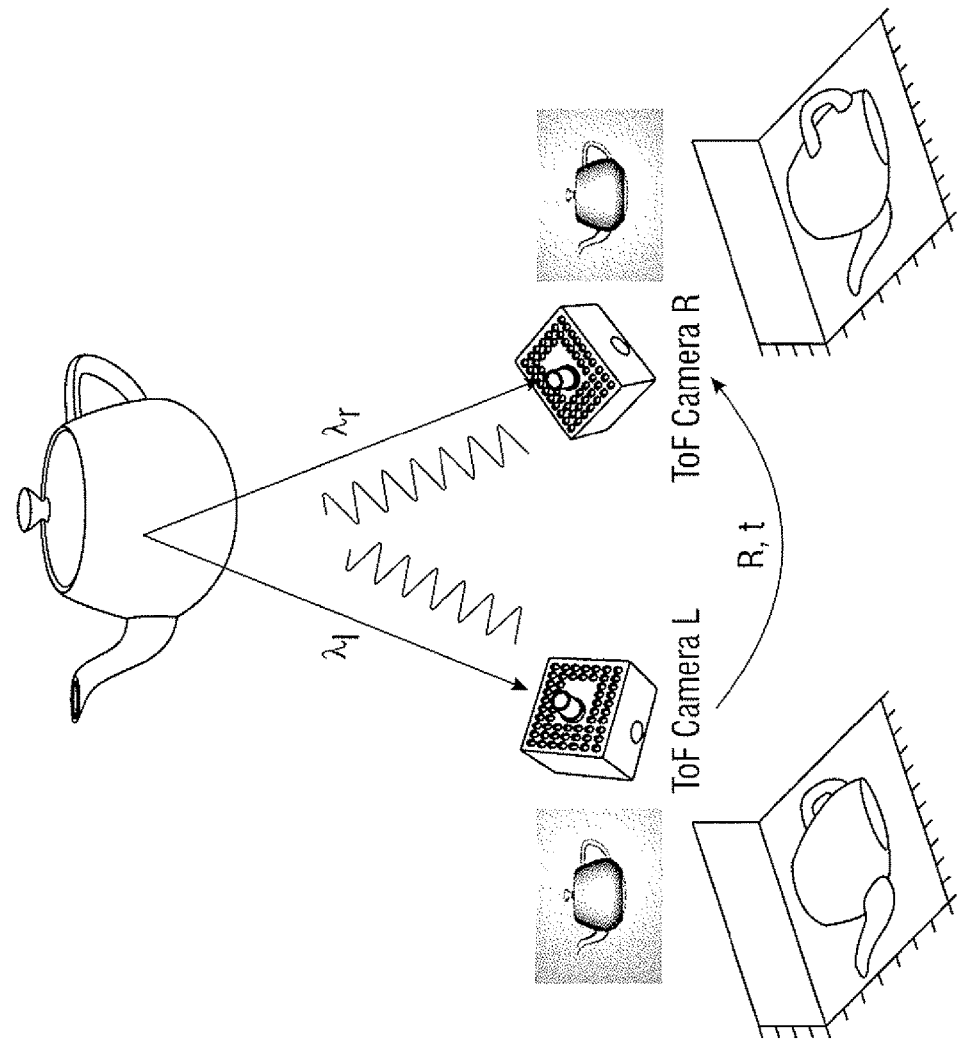
FIG. 1 shows two calibrated ToF cameras configured to acquire measurements under different lighting conditions in order to recover more accurate depth images in accordance with a preferred embodiment of the present invention.

The present invention is based on a known mechanism used by individual ToF cameras to recover the depth images.

To facilitate the measurement of the traveled time (or the time of flight), the intensity of the emitted light is modulated with a sinusoidal signal. With the right choice of modulating frequency, the traveled time required to estimate the distance is directly and unambiguously recovered from the phase shift between the emitted and received signals.

The emitted g(t) and the received signal S(t) may be expressed as sinusoidals of the form:

$$g(t) = A \cdot \cos(\omega \cdot t) + B, \quad (1)$$

$$S(t) = A' \cdot \cos(\omega \cdot t + \varphi) + B', \quad (2)$$

where A represents the amplitude and B the offset of the emitted signal (respectively A' and B' for the received signal), $\omega$ is the modulation frequency in radians per second, and $\varphi$ is the phase shift of the received signal with respect to the emitted signal.

The depth measurement for each pixel of the CMOS/CCD sensor is found by measuring the phase shift $\varphi$ between the two signals. Knowing the emitted signal we can recover the received signal (after some attenuation and deformation) from discrete samples of the signal, using the correlation function $C(\tau)$, i.e. the convolution between the emitted g(t) and received signal S(t):

$$C(\tau) = g(t) \otimes S(t) \quad (3)$$

$$= \lim_{T \to \infty} \frac{1}{T} \int_{-\frac{T}{2}}^{\frac{T}{2}} g(t) \cdot S(t+\tau) \cdot dt,$$

where $\tau$ is the time of the evaluation of the convolution. Replacing the explicit forms of the signals Equations 1 and 2 in the previous expression results in:

$$C(\tau) = \frac{A'A}{2} \cdot \cos(\omega \cdot \tau + \varphi) + BB'. \quad (4)$$

Thanks to this relation, only four samples per pixel are needed to recover the parameters of the received signal A' B' and $\varphi$. The four samples are measured with the CMOS/CCD sensor at times $$\tau_0 = 0,$$

$$\tau_1 = \frac{\pi}{2\omega},$$

$$\tau_2 = \frac{3\pi}{2\omega},$$

$$\tau_3 = \frac{\pi}{\omega}.$$

Evaluating $C(\tau)$ for these 4 values leads to the next equations:

$$C(\tau_0) = \frac{A'A}{2} \cdot \cos(\varphi) + BB', \quad (5)$$

$$C(\tau_1) = -\frac{A'A}{2} \cdot \sin(\varphi) + BB', \quad (6)$$

$$C(\tau_2) = -\frac{A'A}{2} \cdot \cos(\varphi) + BB', \quad (7)$$

$$C(\tau_3) = \frac{A'A}{2} \cdot \sin(\varphi) + BB'. \quad (8)$$

Using the expressions above and some simple trigonometric actions, A' B' and $\varphi$ are recovered as a function of the original signal, namely:

$$A' = \frac{\sqrt{(C(\tau_3) - C(\tau_1))^2 + (C(\tau_0) - C(\tau_2))^2}}{2A} \quad (9)$$

$$B' = \frac{C(\tau_0) + C(\tau_1) + C(\tau_2) + C(\tau_3)}{4B} \quad (10)$$

$$\varphi = \arctan\left(\frac{C(\tau_3) - C(\tau_1)}{C(\tau_0) - C(\tau_2)}\right) \quad (11)$$

Figure 2:
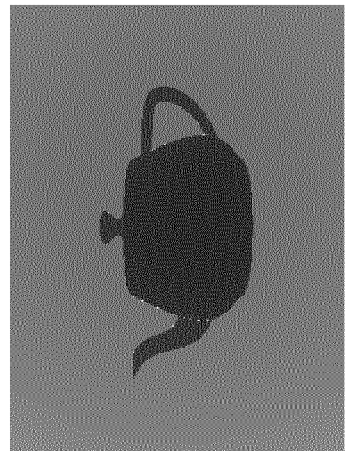
FIG. 2 shows examples of ToF amplitude (left), offset (middle) and depth (right) images obtained from the cameras.
Figure 2:
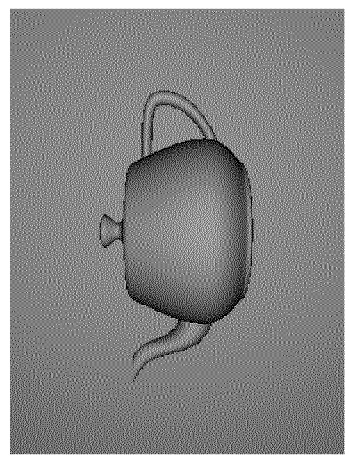
Figure 2:
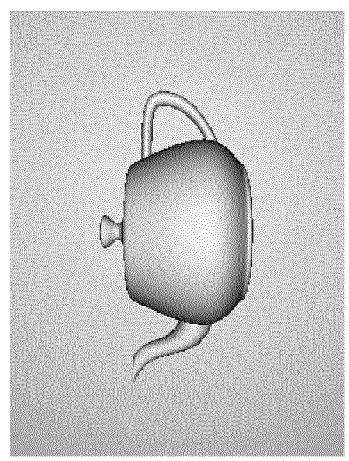

Finally, the phase shift $\varphi$ between the emitted and received signals allows computing the depth d between a pixel and the reflecting object. For each pixel, finding the depth value $\lambda$ reduces to:

$$2 \cdot \lambda = \frac{c_{light}}{2\pi f} \cdot \varphi \Rightarrow \lambda \quad (12)$$

$$= \frac{c_{light}}{4\pi f} \cdot \varphi$$

where $c_{light}$ is the speed of light and f is the frequency of the modulated light signal ($\omega = 2\pi f$). Collecting the values A, B' and $\lambda$ per pixel, three images are obtained: the amplitude, the offset and the depth image. Examples of the ToF images generated with the ToF simulator are shown in FIG. 2.

Several sources of error affect the measurements above, these include the systematic wiggling error due to the difficulty of generating sinusoidal signals, the reflectivity/ integration time deviation altering the measurement by the integration dependant offset and non-linear shift related to the reflectivity, noise from the CMOS/CCD and flying pixel generated by the superposing of signal or for the reflection in borders. As a result the measurements are estimated with an important uncertainty (in the order of cms). To improve the accuracy, the signal reconstruction above is modified to consider stereo ToF measures taken with different lighting conditions, as explained below.

Stereo ToF Cameras

The monocular reconstruction principle described above may be adapted to form a stereo set-up according to a preferred embodiment the present invention in order to enhance the measurements.

A stereo set-up according to a preferred embodiment of the present invention is shown in FIG. 1, wherein both cameras first undergo a calibration step to find the geometric relation between their corresponding image planes (a rigid transformation with a rotation R and translation t).

In contrast to the monocular ToF arrangement described above, the arrangement of this embodiment of the present invention enables the emission of two, preferably infrared, light signals, so at least two concurrent depth images of the scene may be obtained. If the described standard monocular measuring procedure is followed, two depth images will be found independently. However, according to this embodiment of the present invention the acquisition procedure is modified by actively changing the lighting of the scene such that images under the different conditions are obtained. This advantageously enables the determination of the optimal depth image in each camera, based on the known geometry of the stereo set-up and considering three lighting stages. According to this preferred embodiment of the present invention, the three lighting stages are as follows:

Stage 1:

Only the emitter of the left camera is turned on but both cameras capture the reflected light of the left camera, and each camera provides a depth image based thereupon. These measurements can be combined into one coordinate system using the geometry of the setup.

TABLE 1

Three considered stages: "on" and "off" indicate whether the light of the ToF left and right camera are activated.

| Stage | IR Light Left | IR Light Right |
|-------|---------------|----------------|
| 1     | on            | off            |
| 2     | off           | on             |
| 3     | on            | on             |

Stage 2:

Only the emitter of the right camera is turned on. Similar to stage 1, but the emitter is changed so that both cameras capture the reflected light emitted by the right camera.

Stage 3:

Both left and right cameras emit a light signal and capture the reflected light of both. In this stage, both cameras are set to operate at the same modelling frequency such that the sum of contributions of the two light signals is measured.

The first stage permits the first (left) ToF camera to obtain the regular ToF images (depth, amplitude and offset), while the second (right) camera captures the light reflected from the object from a second viewpoint. In the second stage the role of the two cameras is effectively inverted with respect to stage 1. Finally, the third stage allows both the cameras to acquire the combined light emitted by the two cameras simultaneously. The three stages are illustrated in FIG. 3 and summarised in Table 1.

According to an embodiment of the present invention, a method to recover enhanced depth images is also provided. This method is based on the geometry of the setup and on adapting the signal reconstruction (i.e. the recovery of the depth, offset and amplitude images) of the three stages described above. In practice, a cost function is defined based on the new reconstruction equations and then solved using standard non-linear optimisation techniques. In this embodiment, it is assumed that the modulating frequency of the two cameras is the same, and that they work with the same wavelength light and that the scene is static during the three stages. As will be described below in greater detail, no synchronisation of the cameras is required.

Formally, consider the sinusoidal signals $g_l$ and $g_r$ used to modulate the emitted light signals of the two ToF cameras, where $g_l$ corresponds to the light signal of the left ToF camera and $g_r$ to that of the right. We denote with w the modulation frequency of the two cameras, and with $\phi_{l,r}$ the phase shift between the two emitted signals. Then the two signals can be expressed as:

$$g_l(t) = A_l \cdot \cos(\omega \cdot t) + B_l \quad (13)$$

$$g_r(t) = A_r \cdot \cos(\omega \cdot t + \phi_{l,r}) + B_r \quad (14)$$

where, $A_{l,r}$ and $B_{l,r}$ are respectively the amplitude and offset of the sinusoidal waves.

In the following, it is shown how the received signals in the three described stages are reconstructed. This involves recovering the amplitudes $A'_{l,r}$ and $A''_{l,r}$ as well as the offsets $B'_{l,r}$ and $B''_{l,r}$ of each signal. Note that received amplitudes and offsets are distinguished from the emitted ones by the ' and '' symbols. A single ' indicates the received signal was emitted by the same camera. Double '' indicate the receiving camera is different from the emitting one. As before, the recovered signal is obtained from the convolution with a reference signal; this is the internal signal that each camera uses to emit the modulated light signal.

Stage 1

In this case, only the light of the left camera is active and emitting signal $g_l$ (Eq. 13), while both cameras capture the reflected light in the object. It is therefore desired to recover the received signals in both the left and right ToF cameras, denoted here as $S_{l1}$ and $S_{r1}$, respectively, which are of the form:

$$S_{l1}(t) = A'_l \cdot \cos(\overline{\omega} \cdot t + \varphi_l) + B'_l \quad (15)$$

$$S_{r1}(t) = A''_r \cdot \cos\left(\omega \cdot t + \frac{\varphi_l + \varphi_r}{2} + \phi_{lr}\right) + B''_r \quad (16)$$

As mentioned before, reconstructing the signal means recovering the parameters of the two sinusoidals, namely the amplitudes A', A'', the offsets B' and B'', and the phases $\phi_l$ and $$\frac{\varphi_l + \varphi_r}{2}.$$

Notice that in Eq. 16 the phase shift $$\frac{\varphi_l + \varphi_r}{2}$$

is related to the distance traveled by the signal from the left camera to the reflecting surface, and then from the surface back to the right camera. The total phase of $S_{r1}$, that is $$\frac{\varphi_l + \varphi_r}{2} + \phi_{lr}$$

additionally considers the phase shift $\phi_{lr}$ between the emitted signals $g_l(t)$ and $g_r(t)$.

Similar to the monocular case, the convolution of the received and emitted signals in each ToF camera is used, which leads to the following equations:

$$C_{l1}(\tau) = g_l(t) \otimes S_{l1}(t) \quad (17)$$
$$= \frac{A'_l A_l}{2} \cdot \cos(\omega \cdot \tau + \varphi_l) + B_l B'_l$$

$$C_{r1}(\tau) = g_r(t) \otimes S_{r1}(t) \quad (18)$$
$$= \frac{A''_r A_l}{2} \cdot \cos\left(\omega \cdot \tau + \frac{\varphi_l + \varphi_r}{2} + \phi_{lr}\right) + B_l B''_r$$

As before, 4 samples of $C_{l1}(\tau)$ and $C_{r1}(\tau)$ at times $$\tau_0 = 0, \tau_1 = \frac{\pi}{2\omega}, \tau_2 = \frac{3\pi}{2\omega}, \tau_3 = \frac{\pi}{\omega}$$

are obtained. Using Equations 9 to 11 the two signals $S_{l1}$ and $S_{r1}$ can then be reconstructed per pixel and in each camera, as follows:

Left Camera:
the values of the amplitude $A'_l$, offset $B'_l$ and phase $\phi_1$ are calculated from the samples of $C_{l1}(\tau)$.

Right Camera:
from the samples of $C_{r1}(\tau)$ the values of $A''_r$ and $B''_r$ and of the phase $$\xi_1 = \frac{\varphi_1 + \varphi_2}{2} + \phi_{lr}$$

are computed.

Stage 2
Inverting the role of the cameras (now camera two emits signal $g_r(t)$) leads to a similar set of equations (Equations 19 to 22). Once again, it is desired to reconstruct the received signals $S_{l2}(t)$ and $S_{r2}(t)$:

$$S_{l2}(t) = A''_l \cdot \cos\left(\omega \cdot t + \frac{\varphi_l + \varphi_r}{2} - \phi_{lr}\right) + B''_l, \quad (19)$$

$$S_{r2}(t) = A'_r \cdot \cos(\omega \cdot t + \varphi_r) + B'_r, \quad (20)$$

based on the correlations $C_{l2}(\tau)$ and $C_{r2}(\tau)$:

$$C_{l2}(\tau) = g_l(t) \otimes S_{l2}(t), \quad (21)$$
$$= \frac{A''_l A_r}{2} \cdot \cos\left(\omega \cdot \tau + \frac{\varphi_l + \varphi_r}{2} - \phi_{lr}\right) + B_r B''_l,$$

$$C_{r2}(\tau) = g_r(t) \otimes S_{r2}(t), \quad (22)$$
$$= \frac{A'_r A_r}{2} \cdot \cos(\omega \cdot \tau + \varphi_r) + B_r B'_r.$$

The inverted sign of the phase shift $\phi_{lr}$, in Equations 19 and 21, aids with the subsequent estimation of the separate phases $\phi_l$ and $\phi_r$, as described below. Based on these relations the following is computed:

Left Camera:
the values of $A''_l$, $$\xi_2 = \frac{\varphi_l + \varphi_r}{2} - \phi_{lr}$$

and $B'_l$ based on $C_{r2}(\tau)$.

Right Camera:
the values of $A'_r$, $\phi_r$, and $B'_r$ using $C_{l2}(\tau)$.

Stage 3
In the third stage, the lights of the left and right cameras emit signals simultaneously as $g_l(t)$ and $g_r(t)$, and both cameras capture the total amount of reflected light from the two light sources. The signal received by the left ToF camera $S_{l3}(t)$ and by the right ToF camera $S_{r3}(t)$ are of the form:

$$S_{l3}(t) = A'_l \cdot \cos(\omega \cdot t + \varphi_l) + B'_l + A''_l \cdot \cos\left(\omega \cdot t + \frac{\varphi_l + \varphi_r}{2} - \phi_{lr}\right) + B''_l,$$

$$S_{r3}(t) = A'_r \cdot \cos(\omega \cdot t + \varphi_r) + B'_r + A''_r \cdot \cos\left(\omega \cdot t + \frac{\varphi_l + \varphi_r}{2} - \phi_{lr}\right) + B''_r.$$

Convolving the received signals with the emitted (reference) signals in each camera leads to:

$$C_{l3}(\tau) = \frac{A'_l A_l}{2} \cdot \cos(\omega \cdot \tau + \varphi_l) + B_l B'_l +$$
$$= \frac{A''_r A_r}{2} \cdot \cos\left(\omega \cdot \tau + \frac{\varphi_l + \varphi_r}{2} - \phi_{lr}\right) + B_r B''_l,$$

$$C_{r3}(\tau) = \frac{A'_r A_r}{2} \cdot \cos(\omega \cdot \tau + \varphi_r) + B_r B'_r +$$
$$= \frac{A''_r A_l}{2} \cdot \cos\left(\omega \cdot \tau + \frac{\varphi_l + \varphi_r}{2} - \phi_{lr}\right) + B_l B''_r,$$

where $C_{l3}(\tau)$ is the convolution of the received signal $S_{l3}$ with the reference signal in the left ToF camera $g_l(t)$. Similarly, $C_{r3}(\tau)$ results from convolving the received $S_{r3}$ and the reference $g_r(t)$ signals in the right ToF camera.

In stage three it is not practical to directly use the samples of $C_{l3}(\tau)$ and $C_{r3}(\tau)$ because there is not a easy way to relate the values of $\phi_l$, $\phi_r$, and $\phi_{lr}$ with $C_{l3}(\tau)$ and $C_{r3}(\tau)$. Therefore these equations are used to derive additional constraints.

Additional Constraints
With the three stages described in the previous section six measurements $C_{l1}$, $C_{r1}$, $C_{l2}$, $C_{r2}$, $C_{l3}$, $C_{r3}$ are obtained per pixel. These measurements are related to each other. As may be observed, in the absence of noise:

$$C_{l3}(\tau) = C_{l1}(\tau) + C_{l2}(\tau) \quad (23)$$

$$C_{r3}(\tau) = C_{r1}(\tau) + C_{r2}(\tau) \quad (24)$$

These relations of Equations 23 and 24 are used to obtain additional measurement values for each camera. Based on the results of stages 1 and 2, the sum of the individual phases $\phi_l$ and $\phi_r$ are estimated, which are denoted $\zeta_1$. The value of $\zeta_1$ is directly obtained from phases $\xi_1$ and $\xi_2$ computed in stages 1 and 2:

$$\zeta_1 = \xi_1 + \xi_2 = \phi_l + \phi_r \quad (25)$$

$\xi_1$ is used as the first measurement of $\phi_l + \phi_r$. A second measurement of the phase sum, denoted $\zeta_2$, can be obtained by repeating the reconstruction procedure of stages 1 and 2, but using the values of $C_{l4}(\tau)$ and $C_{r4}(\tau)$, instead of $C_{l1}(\tau)$ and $C_{r2}(\tau)$.

The new values of $C_{l4}(\tau)$ and $C_{r4}(\tau)$ can be obtained from Equations 23 and 24, assuming that $C_{l1}(\tau)$ and $C_{r2}(\tau)$ are now known values estimated as described in the stages 1 and 2, that is, $$C_{l4}(\tau) = C_{l3}(\tau) - C_{l1}(\tau), \quad (26)$$

$$C_{r4}(\tau) = C_{r3}(\tau) - C_{r2}(\tau). \quad (27)$$

In this way, the new phase values $\xi'_1$ and $\xi'_2$ are obtained from $C_{l4}(\tau)$ and $C_{r4}(\tau)$ and the additional measurements $\xi_2 = \xi'_1 + \xi'_2$ may be computed.

Depth Optimisation Algorithm

The above formulation assumes the depths observed in the left and right ToF camera are exact. In practice this assumption is not true due to the presence of occlusions and several sources of depth errors. Optimal depth maps may be estimated by gathering all the phase measurements obtained during the three stages are gathered into an optimisation framework that aims at estimating optimal depth maps. It is recalled that the depth values are related by a constant to the phases $\phi_l$ and $\phi_r$ (Equation 12).

A cost function that considers the geometry of the stereo set-up as well as the constraints in Equations 23, 24 and 25 is defined. It is then desired to optimise the depth values $\lambda_l$ and $\lambda_r$. In the left camera, the optimal depth $\lambda_l^*$ is found solving the following minimisation problem:

$$\lambda_l^* = \min_\lambda \|\lambda_l^\wedge - \lambda_l\| + \|T_l^r(\lambda_l^\wedge) - \lambda_{P_r(\lambda_l^\wedge)}\| + \quad (28)$$
$$\left\| \frac{4\pi f}{c_{light}} (\lambda_l^\wedge + T_l^r(\lambda_l^\wedge)) - \varsigma_1 \right\| + \left\| \frac{4\pi f}{c_{light}} (\lambda_l^\wedge + T_l^r(\lambda_l^\wedge)) - \varsigma_2 \right\|,$$

where $\lambda_l$ is the current depth estimate and $$\lambda_l = \frac{c_{light}}{4\pi f} \cdot \varphi_l$$

is the measurement obtained in stage 1; $T_l^\tau$ is a transformation that converts a depth value in the left camera to a depth value in the light camera using the geometry of the calibration and $P_r$ is a function that projects the current depth estimate $\lambda_l$, to obtain the corresponding image position in the right image. Intuitively, the first term penalises the differences between the estimated and the measured depths in the left image. The second term penalizes the equivalent difference in the right image. The optimised depth in the left image is projected to the right image, i.e. $P_r(\lambda_l^\wedge)$, to find the image position where the measurement is to be taken from. Finally the depth sum of estimated phases is compared to the phase sums $\xi_1$ and $\xi_2$.

The minimisation problem is applied individually to every pixel in the image and the left and right depth maps are optimised separately, although in each case the measurements of the two cameras are used. The optimisation is solved using standard gradient descent based methods. A good estimation of the initial values can be obtained from the measurements in stage 1 and 2.

Since $\lambda_1$ is a function of $\lambda_2$ which corresponds to the 3D point observed in the ToF camera 2 projected to the ToF camera 1. Because, by virtue of the present invention, each pixel can be optimised individually, parallelisation of the necessary computations may be facilitated, thereby advantageously increasing the frame rate of the calculations.

Although the above examples of the present invention are based on two cameras, in a further embodiment of the present invention, the methodology can be extended to more than two cameras by modifying the number of stages accordingly. Furthermore, in another embodiment, the light emission states may be generated by emitting light signals from different combinations of the cameras. In other embodiments, at least one of the light-emission states may be generated by emitting light signals either consecutively from each camera or simultaneously from all the cameras, or even emitting the light signals consecutively from each camera and then simultaneously from at least two cameras. By increasing the number of light emission states and combinations of cameras, more measurements may be obtained which can be used to optimise the depth values in each camera and improve the overall accuracy of a depth image comprising such depth values.

Furthermore, although the proposed method according to an embodiment of the present invention works pixel wise, which enables real-time implementations, regularisation terms in the optimisation can be incorporated to enforce surface smoothness. Further types of optimisation, including global optimisation methods, can also be implemented. Also, additional pre-processing steps such as filtering and depth calibrations could be used for the images obtained on the individual measurement images.

Moreover, although the above example of a preferred embodiment of the present invention describes the set-up with cameras using the same parameters such as wavelength, modulation frequency, amplitude, and integration times, according to other embodiments of the invention, depth measurements can be obtained and constraints derived for multiple time-of-flight cameras working with signals having different parameters i.e. wavelengths, modulation frequencies, amplitudes, and/or integration times. Some examples of the effects of varying these parameters are described below.

Since different infrared wavelengths have different reflectivity in the same material, implementation thereof enables the determination of the optimal wavelength for an object of a given material.

Since the modulation frequency parameter defines the maximum distance that the camera can measure, by altering the modulation frequency, different objects that lie at different distances with respect to the sensor may be focused upon. As the modulation frequency defines the depth resolution, adjustment of this parameter can help achieve optimal resolution of a given object.

The amplitude parameter of the received signal depends on two facts, the distance and reflectivity of the material. By varying the amplitude of the emitted signal parameter, different materials and/or different distances may be better observed. For example, in the case the received amplitude is too low, it is possible to increase the amplitude of the emitted signal in order to increase the signal to noise ratio. Likewise, if the amplitude of the received signal is too high, the amplitude of the emitted signal may be reduced to avoid saturating the sensor.

The integration time is the time during which the sensor at each camera samples the received signal. By increasing the integration time, a depth measurement with less noise is obtained, thereby reducing error and advantageously providing a more accurate depth image although increasing processing time by obtaining the depth measurement at a slower frame rate. On the other hand, a reduced integration time leads to a faster frame rate and thus quicker processing time, although a noisier measurement is obtained.

In further embodiments of the present invention, the method can be even implemented in a per-pixel fashion, such that the acquisition parameters are optimised for getting the best measurements for every individual pixel in each camera. For example, in such a per-pixel framework the different illumination stages and measurements may be performed once per pixel i.e. individually for every pixel. The considered acquisition parameters could be the amplitude and modulation frequency of the signal, as well as the wavelength and integration time of the time-of-flight camera. These parameters may each be specified separately and varied in order to obtain optimal depth measure for each pixel. According to a further embodiment, such parameter optimisation can additionally be done in an iterative framework, wherein the parameters of the next iteration are computed from the initial measured or estimated depth values.

In summary, optimisation of parameters per pixel enables to the best depth value to be obtained, for a particular observed object i.e. according to its material and distance. Similarly, using cameras with different parameters (not at the pixel level) enables focusing each camera to observe different objects i.e. comprising different materials, at different distances in a scene.

It will be understood by the skilled person that the method of the present invention may be implemented by virtue of a computer-implemented storage medium comprising instructions stored thereupon that, when executed, cause a processor-based system to perform any of the aforementioned method steps, or an apparatus for depth image acquisition of a scene comprising at least two time-of flight cameras and suitable e.g. controlling, sensing and/or processing means adapted to perform the aforementioned method steps.

It will also be appreciated that the above described embodiments are described as examples only, and that modifications to these embodiments are included within the scope of the appended claims.

The invention claimed is:

1. A method of depth image acquisition of an object including the steps of:
    providing at least two time-of-flight cameras in a camera arrangement;
    calibrating a geometry of the camera arrangement;
    illuminating the object with a plurality of different light emission states by emitting light signals in consecutive steps from each camera;
    obtaining measurements at all the cameras of the light reflected by the object during each of the consecutive steps, wherein in each of the consecutive steps, the cameras operate at a same modulation frequency; and
    generating a depth image based on a combination of the measurements at all the cameras.

2. The method of claim 1 further including providing more than two cameras, wherein the light emission states are generated by emitting light signals from different combinations of the at least two time-of-flight cameras.

3. The method of claim 1 wherein at least one of the light-emission states is generated by emitting light signals simultaneously from all the cameras.

4. The method of claim 1 wherein a plurality of the light-emission states are generated by emitting light signals consecutively from each camera.

5. The method of claim 1 wherein the light-emission states are generated by emitting light signals consecutively from each camera and then simultaneously from at least two cameras.

6. The method of claim 1 wherein the step of obtaining measurements further includes at least one of the following:
    sampling a convolution of the received and emitted signals at different times;
    obtaining depth, amplitude and offset images of a scene at the camera emitting light signals; and
    measuring the phase shift between signals in each light emission state.

7. The method of claim 1 further including:
    determining depth values for each camera using a set of constraints derived from the measurements; and
    generating enhanced depth images by optimizing the depth values at each of the cameras.

8. The method of claim 1 wherein the light signals emitted from all cameras include infrared light signals.

9. The method of claim 1, wherein at least one of the following parameters is different for at least two of the cameras:
    a wavelength of the light signals emitted from the cameras;
    an amplitude of the light signals emitted from the cameras; and
    an integration time of the cameras.

10. The method of claim 1, wherein, each camera includes a plurality of pixels, and for each pixel at each camera, at least one of the following:
    the measurements are performed individually;
    the modulation frequency of the light emitted from each camera is specified separately;
    an amplitude of the light emitted from each camera is specified separately;
    a wavelength of the light emitted from each camera is specified separately; and
    an integration time of each camera is specified separately.

11. The method of claim 1 wherein each camera includes a plurality of pixels, and the method is repeated iteratively over time to optimize at least one of the following parameters:
    the wavelength of the emitted light,
    a time-of-flight integration time,
    an amplitude and frequency of the modulation signal; and
    wherein the parameters are determined for each pixel individually based on their depth values and iteratively updated to optimize the depth values for every pixel in each camera.

12. A non-transitory computer-readable medium comprising instructions stored thereupon that, when executed, cause a processor-based system to perform the method of depth image acquisition of an object, the method steps including:
    calibrating the geometry of a camera arrangement of at least two time-of-flight cameras;
    illuminating the object with a plurality of different light emission states by emitting light signals in consecutive steps from each camera;

obtaining measurements at all the cameras of the light reflected by the object during each of the consecutive steps, wherein in each of the consecutive steps, the cameras operate at the same modulation frequency; and generating a depth image based on a combination of the measurements at all the cameras.

13. An apparatus for depth image acquisition of a scene including:

at least two time-of flight cameras in a camera arrangement;

wherein the apparatus is adapted to calibrate a geometry of the camera arrangement;

illuminate the scene with a plurality of different light emission states by emitting light signals in consecutive steps from each camera;

obtain measurements at all the cameras of the light reflected by the scene during each of the consecutive steps, wherein in each of the consecutive steps, the cameras operate at the same modulation frequency;

generate a depth image based on a combination of the measurements at all the cameras.

* * * * *